US005594454A

United States Patent [19]
Devereux et al.

[11] Patent Number: 5,594,454
[45] Date of Patent: Jan. 14, 1997

[54] GLOBAL POSITIONING SYSTEM (GPS) LINKED SATELLITE AND MISSILE COMMUNICATION SYSTEMS

[75] Inventors: William S. Devereux, Glenwood; Michael H. Boehme, Sykesville; Lloyd Linstrom, Columbia; Thomas R. McKnight, Jr., Ellicott City; Robert C. Moore, Laurel; John R. Meyer, Baltimore; Paul R. Snow, Ellicott City; Paul D. Grimm, Severna Park, all of Md.

[73] Assignee: The Johns Hopkins University, Baltimore, Md.

[21] Appl. No.: 630,559

[22] Filed: Apr. 10, 1996

Related U.S. Application Data

[63] Continuation of Ser. No. 227,312, Apr. 13, 1994, abandoned.

[51] Int. Cl.$^6$ .................................................. G01S 5/02
[52] U.S. Cl. .............................. 342/357; 342/352
[58] Field of Search ...................... 342/357, 352; 455/12.1, 13.1, 33.1

[56] References Cited

U.S. PATENT DOCUMENTS

| | | | |
|---|---|---|---|
| 4,622,557 | 11/1986 | Westerfield | 342/357 |
| 5,153,598 | 10/1992 | Alves | 342/352 |
| 5,187,805 | 2/1993 | Bertiger et al. | 455/12.1 |
| 5,345,244 | 9/1994 | Gildea et al. | 342/357 |
| 5,379,320 | 1/1995 | Fernandes et al. | 375/1 |
| 5,420,592 | 5/1995 | Johnson | 342/357 |
| 5,420,593 | 5/1995 | Niles | 342/357 |

OTHER PUBLICATIONS

Devereux, W. S., Duven, D. J. and Boehme, M. H., "The GPS/Telemetry Transmitter (GTT)—A Small GPS Transdigitizer and Telemetry Transmitter," AIAA Paper No. 93-2693, *2nd Annual AIAA SDIO Interceptor Technology Conf.* (Jun. 1993).

Duven, D. J. and Devereux, W. S., "Multisensor Miss Distance Measurement Systems for Test and Evaluation of High Speed Intercepts," in *49th Annual Mtg. ION* (1993).

Devereux, W. S. and Duven, D. J., "The GPS–Linked Transponder—A Command, Telemetry, and Positioning System for Small Spacecraft," *7th Annual AIAA/Utah State University Conf. on Small Satellites* (Sep. 1993).

Devereux, W. S. and Duven, D. J., "A Command, Telemetry, and Positioning System for Spacecraft Using GPS Transdigitizers," in *Proc. ION GPS–93* (Sep. 1993).

*Primary Examiner*—Thomas H. Tarcza
*Assistant Examiner*—Dao L. Phan
*Attorney, Agent, or Firm*—Francis A. Cooch

[57] ABSTRACT

A small, multi-function device called the GPS/Telemetry Transmitter (GTT) that can recover telemetry (TM) data from missiles, spacecraft, balloons, or any moving platform or vehicle, and generate high accuracy trajectory estimates using GPS data is disclosed. Additionally, the concept underlying the GTT of transmitting high-data-rate telemetry and instrument data concurrently with transdigitized GPS data is incorporated in a GPS-Linked Transponder (GLT) resulting in a simpler and cheaper satellite positioning system.

10 Claims, 9 Drawing Sheets

GLOBAL POSITIONING SYSTEM (GPS) LINKED SATELLITE AND MISSILE COMMUNICATION SYSTEMS

STATEMENT OF GOVERNMENTAL INTEREST

The Government has rights in this invention pursuant to Contract No. N00039-91-C-0001 awarded by the Department of the Navy.

BACKGROUND OF THE INVENTION

This application is a continuation of application Ser. No. 08/227,312 filed on Apr. 13, 1994 abandoned.

The invention relates to satellite and missile communication systems that utilize GPS data more efficiently. More specifically, one embodiment of the invention is a small, multi-function device called the GPS/Telemetry Transmitter (GTT) that can recover telemetry (TM) data from missiles, spacecraft, balloons, or any moving platform or vehicle, and generate high accuracy trajectory estimates using GPS data. In a second embodiment, the concept underlying the GTT of transmitting high-data-rate telemetry and instrument data concurrently with transdigitized GPS data is incorporated in a GPS-Linked Transponder (GLT) resulting in a simpler and cheaper satellite positioning system.

A broad range of systems and instruments currently support the test and evaluation (T&E) of missiles and missile-intercept systems. However, like any system or instrument, each has its limitations. For example, almost all test programs use ground-based radars, and many include aircraft and/or ground-based optics. For the large slant ranges involved in many tests, the usefulness of these systems for accurate test evaluation is limited.

Missile telemetry transmitters and encryption modules, which typically relay housekeeping, sensor, and inertial measurement unit data, are universally employed. Although necessary, telemetry data alone are not sufficient for an objective and complete evaluation of weapons systems because the data are sourced by the unit under test and are therefore not independent.

Cooperative and noncooperative miss-distance indicators (MDIs) have been used for years in surface-to-air and air-to-air missile test programs, but available systems typically support only low intercept speeds, provide scalar (not vector) results, and yield useful data only when the target and the interceptor are in close proximity (<100 ft.).

GPS translators, perhaps the most useful instruments in T&E, are used on missile, target, and interceptor vehicles to generate high-accuracy best-estimated trajectories (BETs) and, for intercept missions, miss-distance and point-of-impact estimates. Here, the penalties have been the size, weight, and power consumption of available translators and the inability to encrypt the analog translator's output signal.

The present method of positioning satellites, including the Space Ground-Link System (SGLS) and NASA standard transponders, involves the use of complex spacecraft hardware to accomplish coherent retransmission of an uplinked ranging signal and to allow two-way Doppler measurements on the ground. Several severe penalties are imposed on the user with this approach, including the complexity and excessive size, mass and cost of the spacecraft hardware. Additionally, because complex ground-station hardware is needed to generate and transmit the ranging signals to the spacecraft and to receive and process the signals retransmitted by the transponder, the user is constrained to more costly institutional methods for generating accurate orbit estimates of the spacecraft. Mission planning, operations, and ground-system scheduling tasks to accommodate the positioning process are significant, labor intensive, and costly.

SUMMARY OF THE INVENTION

The GTT embodiment of the invention overcomes many of the limitations inherent in translators and other current T&E hardware and systems. The GTT, which incorporates GPS transdigitizer concepts contained in U.S. Pat. No. 4,622,577 (incorporated herein by reference), is a state-of-the-art telemetry system that also provides the functionality and benefits of a GPS translator without the extra weight, size and power of a separate hardware system.

Unlike a GPS translator's analog output, the transdigitizer's output profits from digital telecommunication technology. The inherent benefits include improved noise immunity, reduced transmitter and downlink-induced distortions, quantifiable downlink-induced losses, and the ability to encode and encrypt the data, thereby denying access to GPS-derived high-accuracy missile trajectory data by unauthorized users.

The GTT, whose primary purpose is test and evaluation of the guidance systems for missiles and missile intercept systems, incorporates the functionality of four heretofore separate T&E systems: a high data rate telemetry transmitter, (2) an encryption module to provide secure telemetry data transmission, (3) a GPS transdigitizer and (4) the encryption module for the GPS transdigitizer output. By incorporating those four systems, the GTT can be used on small missiles where reduced mass, size and power are critical.

In summary, the salient features of the GTT are as follows:
- Small size, low mass, low power
- Power-efficient phase modulation
- High data rate telemetry transmitter (up to 10 Mbps)
- Embedded GPS transdigitizer
- Secure transmission of telemetry and GPS data
- Built-in FEC and differential encoder
- Signal structure enabling standard range hardware to recover telemetry data
- GPS-derived trajectories provided nearly "free" to host vehicle
- Missile and missile-intercept test planners provided with instrumentation small and light enough to enable its use on the latest state-of-the-art weapons systems To overcome the limitations relating to satellite positioning systems and provide significant enhancements thereto, the GLT will replace the standard coherent transponder and result in the modification of existing ground-based systems to provide significantly smaller and lighter-weight flight systems in addition to simplified ground stations with reduced operating costs. The GLT comprises a NASA Spaceflight Tracking and Data Network (STDN)/Deep Space Network (DSN)-compatible or Air Force Satellite Control Network (AFSCN)/SGLS-compatible command receiver/detector, a 20-Mbps-capable pulse code modulation/phase shift keying (PCM/PSK) telemetry transmitter with a selectable-rate forward error correction (FEC) encoder and optional encryptor, and a dual-mode spacecraft positioning subsystem including a full GPS receiver/navigator and/or GPS transdigitizer.

The GLT system will recover high-accuracy spacecraft position and time data—either in real time autonomously or in near-real time on the ground—using advanced GPS positioning techniques. A simplified command receiver option is also available when compatibility with existing standards is not required and improved capability is desired. In the transdigitizer-only mode, mass and size are reduced to nearly one-tenth of existing transponder systems. Other advantages include reduced complexity and significantly higher uplink and downlink data rate communications than presently supported. Five ground-station configurations are described, each providing varying levels of spacecraft positioning accuracies to the user.

BRIEF DESCRIPTION OF THE DRAWINGS

FIG. 5, consisting of FIGS. 5(a), 5(b) and 5(c), illustrates the implementation and characteristics of the UO-QPSK modulator used in the GTT embodiment of the invention.

DESCRIPTION OF THE PREFERRED EMBODIMENTS

Figures 1, 8:
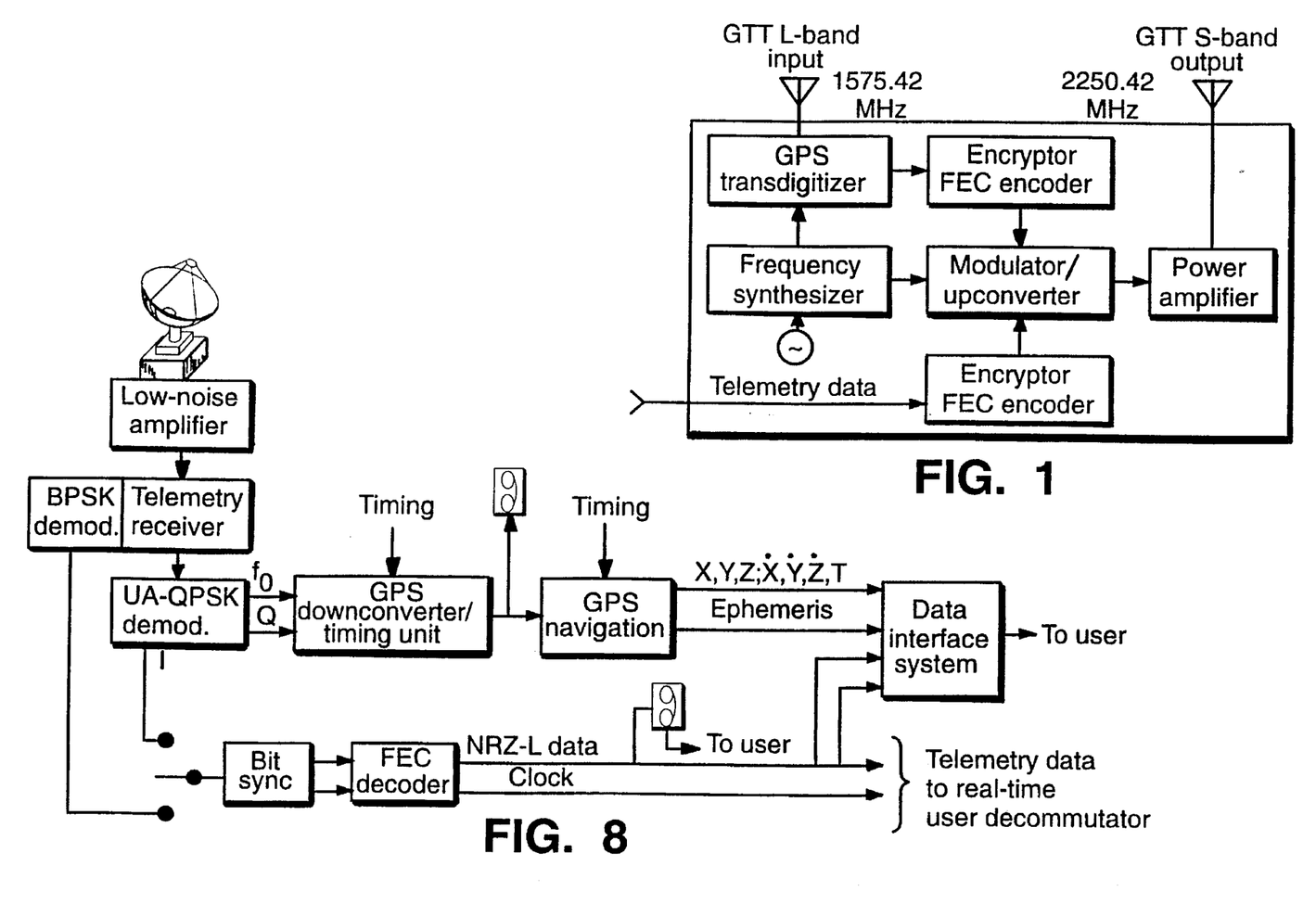
FIG. 1 is a simplified block diagram of the GTT embodiment of the invention.
FIG. 8 illustrates the single-station stand-alone configuration of the GLT ground system.

The GTT embodiment of the invention has two primary functions, as shown in FIG. 1. (For purposes of the following discussion, assume that the GTT is located in a missile but it could be on any moving platform.) The first is that of a telemetry data encryptor/transmitter. This function is performed by receiving the telemetry bit stream from the missile's pulse code modulation encoder and processing the data with an encryptor and a differential encoder. Forward error correction (FEC) encoding is also available if optionally selected. The resultant bit stream is then transmitted to the ground station(s) via an S-band RF digital data link through a microstrip antenna system.

The second GTT function is that of a digital GPS translator or transdigitizer. This function is implemented by receiving GPS L1 clear acquisition (C/A) code signals via an L-band microstrip antenna system and downconverting these signals to near-baseband. The baseband signal is hard-limited, sampled, processed like the telemetry data (encrypted and encoded), and also transmitted to the ground station(s) via the same S-band RF data link. The GTT contains its own fundamental oscillator, generates all required local oscillator (LO) signals internally, and operates on DC power input from the missile. To minimize size, mass, and power dissipation, the frequency plan is devised so that the GPS downconverter and the telemetry transmitter sections share the same LOs whenever possible.

Figure 2:
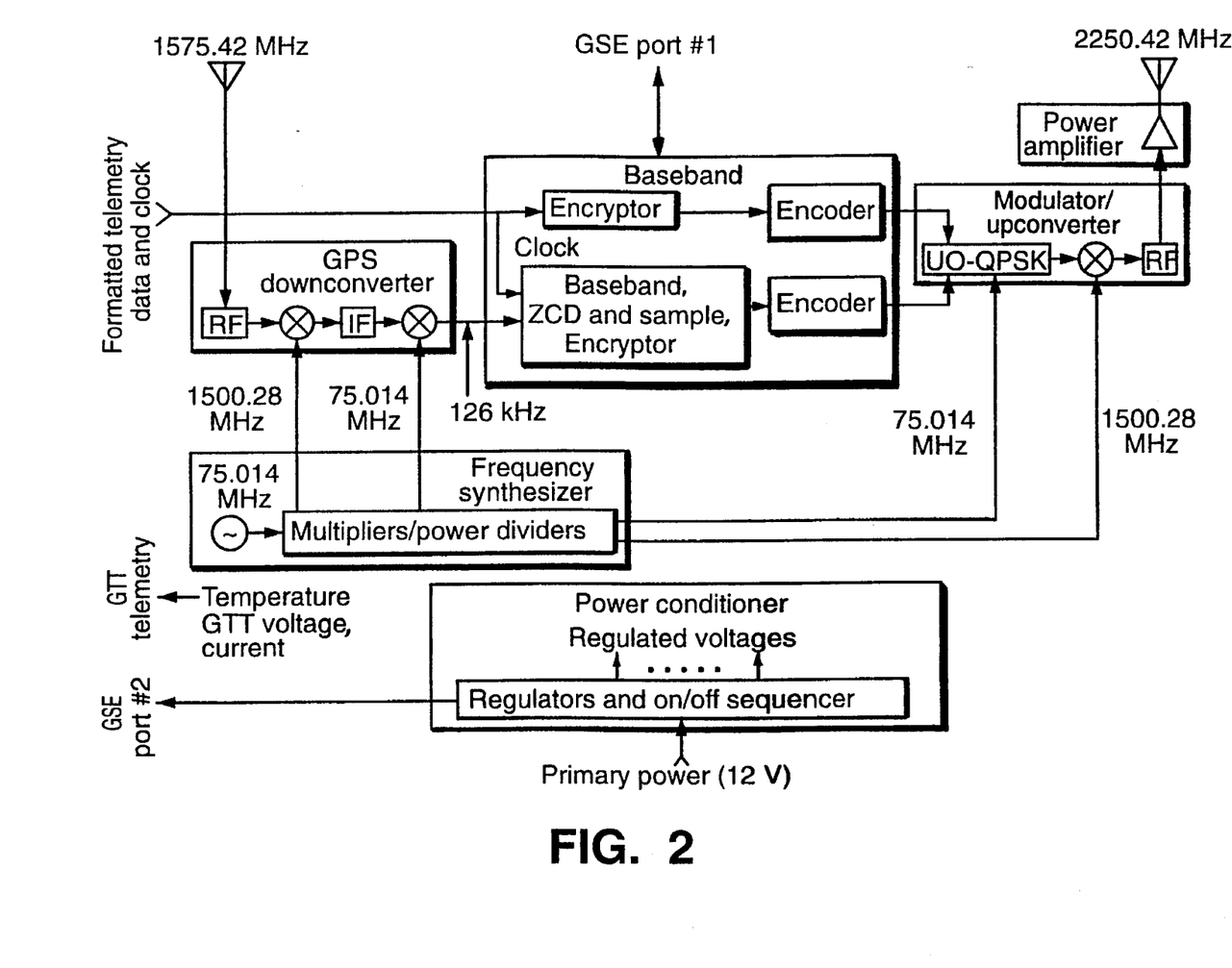
FIG. 2 is a detailed block diagram of the GTT embodiment of the invention.

FIG. 2 is a detailed block diagram of the GTT embodiment of the invention. The six major subsystems are: (1) GPS downconverter, (2) baseband, (3) modulator/upconverter, (4) power amplifier, (5) frequency synthesizer, and (6) power conditioner. The functional operation of each subsystem is described below.

The GPS downconverter accepts GPS signals from the missile L-band receive antenna system and implements a dual superheterodyne downconverting receiver. Using two LO signals from the frequency synthesizer, the 2-MHz band centered at 1575.42 MHz containing GPS C/A code signals is converted to a baseband frequency centered at 126 kHz. Included in this process are narrowband RF and IF filtering to establish the required signal-to-noise ratio and to allow successful system operation in the presence of friendly jammers such as radars and other telemetry transmitters.

The process also includes nearly 100 dB of amplification to provide a baseband signal that can be digitized. The translated spectrum is passed to the baseband subsystem for A/D conversion and signal processing.

Figure 3:
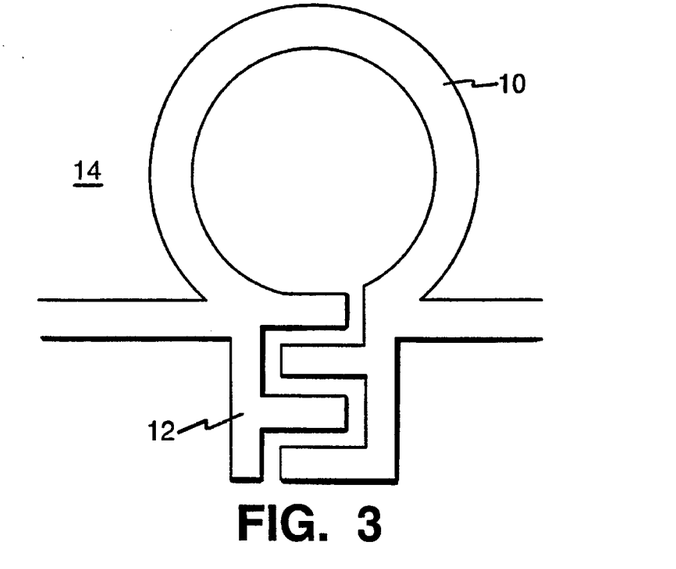
FIG. 3 illustrates a printed lumped element C-band null network circuit employed in the GTT embodiment of the invention.

A special circuit has been designed to be cascaded with the ceramic filters used in the GPS downconverter to reduce the filters' "comeback" effect. More specifically, the circuit is a printed, parallel resonant null network or trap circuit designed to attenuate frequencies around 4.2 GHz while presenting minimum insertion loss at the 1575.42 MHz GPS L1 frequency.

Figure 4:
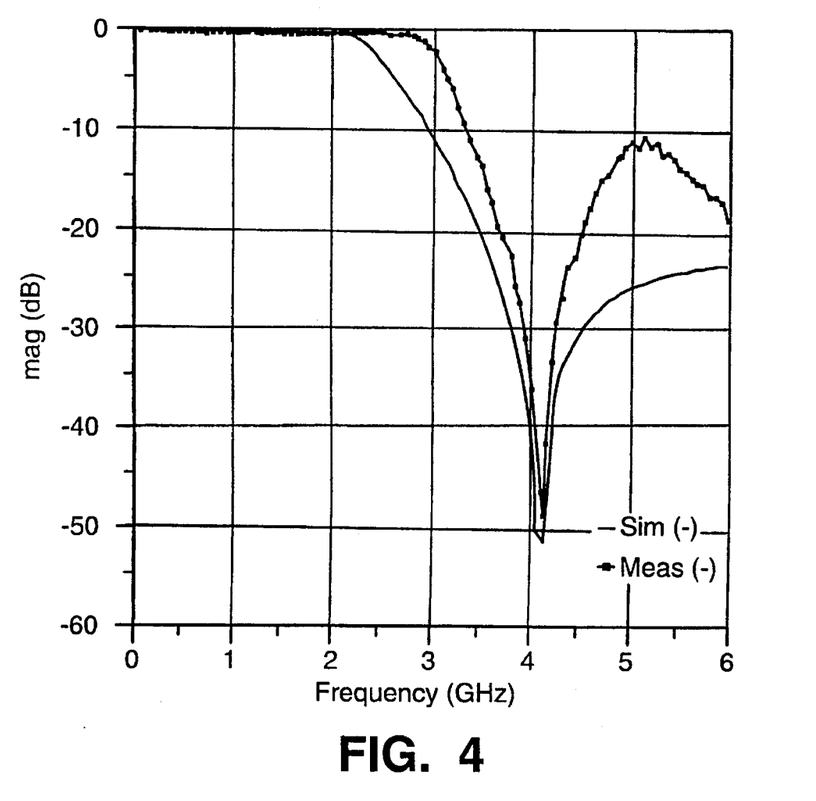
FIG. 4 is graph showing simulated vs. measured data for the printed lumped element C-band null network circuit.

As shown in FIG. 3, the elements of the circuit are a loop inductor 10 and an interdigital capacitor 12 integrated together on a substrate 14. No discreet parts are required and the input/output feeds are designed to the same width as a coplanar with ground 50 Ω transmission line so that no matching is necessary. FIG. 4 is a graph showing simulated vs. measured data for the invention.

The low cost (part of PC board), light weight and high reliability together with the "drop in" cascadability of the circuit (i.e., as a standard cell in a radio frequency computer aided engineering library) and the integrated inductor/capacitor approach make the circuit unique.

The GTT baseband subsystem performs GPS and telemetry data signal processing. A formatted non-return-to-zero-level (NRZ-L) telemetry data stream and clock are received from the missile's telemetry processing computer. Simultaneously, the GPS signal received from the downconverter is amplified, filtered, and digitized by a 1-bit A/D converter (providing about 30 dB of equivalent automatic gain control for the receiver), and then sampled by a ≈2-MHz clock derived from the telemetry data clock.

Both data streams are then similarly processed in parallel. Each signal is encrypted to deny access by unauthorized receivers using minimal implementation encryption configurations. The signals are then converted to the NRZ-mark (NRZ-M) format to ensure unambiguous polarity determination of the recovered data when bit-synchronized. If selected by control inputs, the data are also encoded by a rate ½ convolutional encoder. The data streams are then converted to modulator drive signals and sent to the modulator/upconverter.

The modulator/upconverter accepts the modulation signals from the baseband subsystem as well as a UHF carrier signal and an LO signal from the frequency synthesizer. Both baseband signals are modulated onto the carrier signal using a UO-QPSK modulator as will now be described.

The GTT design is unique in that it provides the multiple functionality previously described in one package. Considerably different requirements exist for the two RF data links supported. The telemetry channel must transmit nearly 4 Mbps of encrypted data with a postdecrypt bit error rate (BER) requirement of $10^{-6}$, whereas the GPS transdigitizer channel must transmit only ≈2 Mbps of encrypted data with a postdecrypt BER requirement of $10^{-3}$.

To optimally satisfy these different sets of requirements, a modulation scheme called unbalanced offset-quadrature phase shift keying (UO-QPSK) is used, wherein the telemetry data modulate the in-phase or "I" channel of a QPSK modulator while the GPS data modulate an attenuated quadrature-phase or "Q" channel. The resultant signal has an I/Q power ratio of 6 dB, and the "penalty" to the telemetry link due to the presence of the GPS data link is only 1 dB.

Figure 5A:
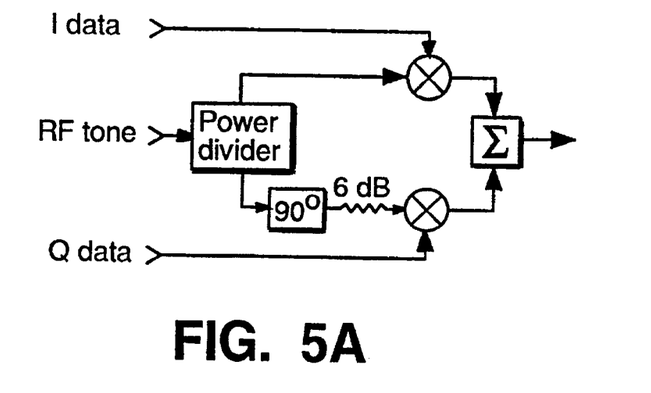
Figure 5B:
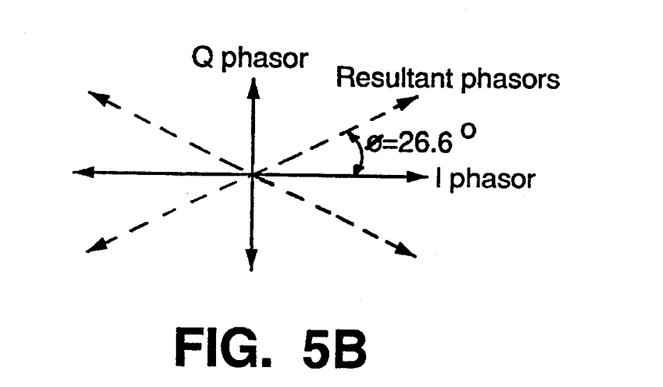
Figure 5C:
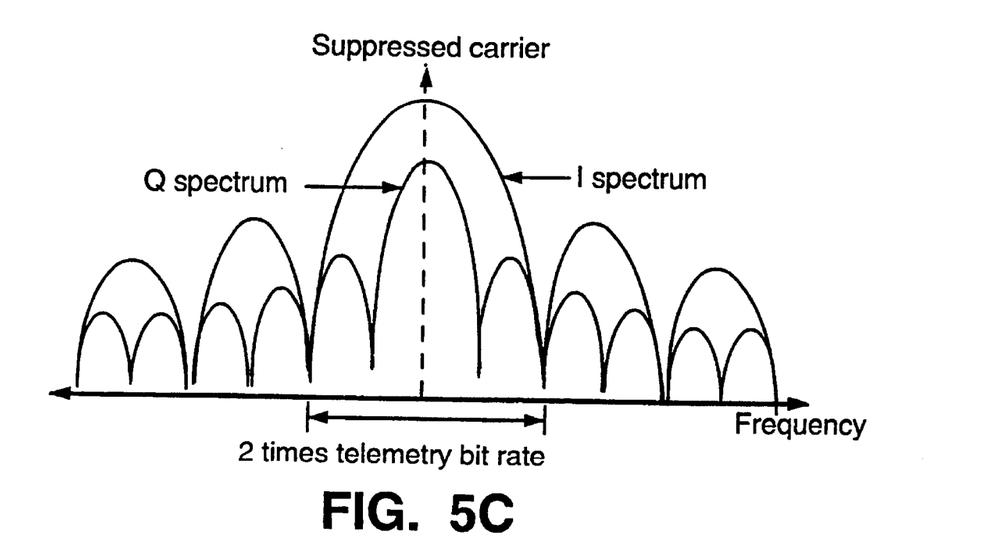

The modulator block diagram, phasor diagram and output spectrum are shown in FIGS. 5(a), 5(b) and 5(c), respectively. The offset between the quadrature components is provided to eliminate 180° phase transitions and the resultant bandpass filter-induced amplitude modulation, which could lead to sideband regrowth due to nonlinear effects of the power amplifier. (In fact, this problem does not occur in the GTT because the bandpass filter is relatively wideband, and the power amplifier operates class A/B.)

The UO-QPSK modulation scheme is uniquely well-suited for the GTT application for a number of reasons. First, it enables concurrent transmission of two different data streams on a single downlink and allows the ground system demodulator to unambiguously separate the I/Q signals. Second, it enables standard range telemetry receivers with BPSK (biphase shift keying) demodulators to recover missile telemetry data while the GTT concurrently transmits GPS-transdigitized data. Third, it allows sharing of resources like the mechanical package, internal power conditioners, oscillator, frequency synthesizers, amplifiers, etc., thereby providing a combined system that is smaller and lighter than the sum of two separate systems. Lastly, it facilitates the optimal sharing of transmitter power between the two links.

The telemetry link on the I channel requires the most power because: (1) the bit rate is double that of the Q channel, and (2) the I-channel BER requirement is $10^{-6}$, whereas that of the Q channel is only $10^{-3}$. Therefore, the GPS transdigitizer function is provided with minimal excess circuitry, mass, size, and power (transmitted and primary) relative to what is required for the telemetry transmitter function; that is, the GPS transdigitizer function comes very nearly "free" to the missile as measured by size, mass, and prime power.

The tolerance to high BERs on the Q channel results from the transdigitizer being, in effect, the RF front end of a GPS receiver/tracker/navigator; the receiver is on the missile, and the tracker/navigator is on the ground where its input signals are received from a tape recorder during playback. The missile to groundstation communications link can be viewed as a long, flexible cable linking the RF subsystem to the digital processing subsystem. The GPS signal power density at the receiver is ≈−190 dBm/Hz, while the thermal noise in the receiver's front end can be modeled as additive white gaussian noise (AWGN) with a noise power density ≈−174 dBm/Hz. Therefore, the GPS signal-to-noise ratio, in the 2-MHz passband of the receiver, is about −15 dB, and the transdigitizer is primarily processing noise. Consequently, if the downlink communication system corrupts the transdigitized data stream with AWGN, noise is corrupted by noise, and until the link BER approaches $10^{-2}$, the GPS trackers are not appreciably affected. (The high carrier-to-noise ratio that enables low-noise Doppler tracking of the GPS signal occurs in the carrier tracking loops within the GPS receiver after the spread-spectrum coding gain is realized in the code correlation process.)

The UO-QPSK modulated signal is upconverted to S-band using the LO to obtain the GTT output frequency of 2250.42 MHz. The resultant signal is then amplified with linear GaAs monolithic microwave integrated circuit (MMIC) amplifiers. Filtering is provided to suppress unwanted mixer by-products and to further reduce out-of-band energy to eliminate the possibility of self-jamming the GPS receiver. The resultant signal is then output to the power amplifier.

The power amplifier accepts the modulated S-band signal from the modulator/upconverter and amplifies it to 1 W using a two-stage power GaAs FET implementation. The signal is passed through an isolator, which protects the amplifier from impedance mismatches and other signals entering the output port, and then is radiated by the S-band transmit antenna.

The frequency synthesizer generates the LO signals required by the GPS downconverter and the modulator/upconverter. It includes a fundamental crystal oscillator that operates at 75.014 MHz and a phase-locked synthesizer/frequency doubler implemented in a GaAs hybrid. The phase-locked source generates $10*f$ and $20*f$ LOs, where $f$=the fundamental frequency.

The power conditioner, implemented in a custom hybrid, accepts a DC voltage from the missile and conditions this voltage via linear regulators for use by the other subsystems. Power-on and power-off sequencing are provided to ensure reliable operation of the GTT's GaAS FET devices.

Figure 6:
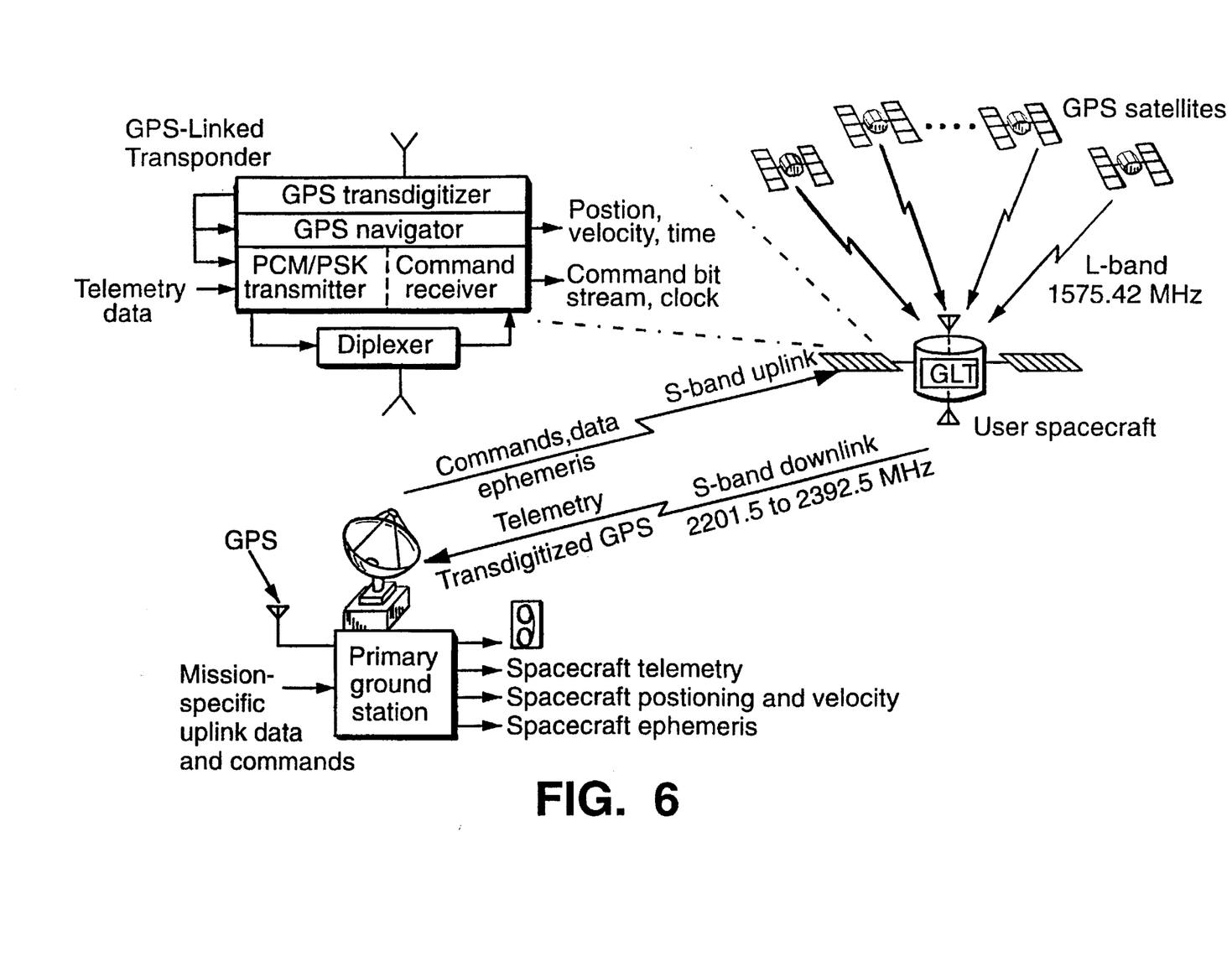
FIG. 6 illustrates the GPS-Linked Transponder (GLT) Command, Telemetry and Positioning System embodiment of the invention.

The major elements of the GLT system, as shown in FIG. 6, are: (1) the GLT, (2) spacecraft L-band antenna for reception of GPS satellite signals, (3) spacecraft S-band antenna for reception of command uplink and transmission of GLT downlink, and (4) diplexer comprising the space segment hardware, and (5) one or more ground stations including optional ground-based GPS receivers for differential navigation. Existing GPS satellite signals are utilized in real time by the system.

Figure 7:
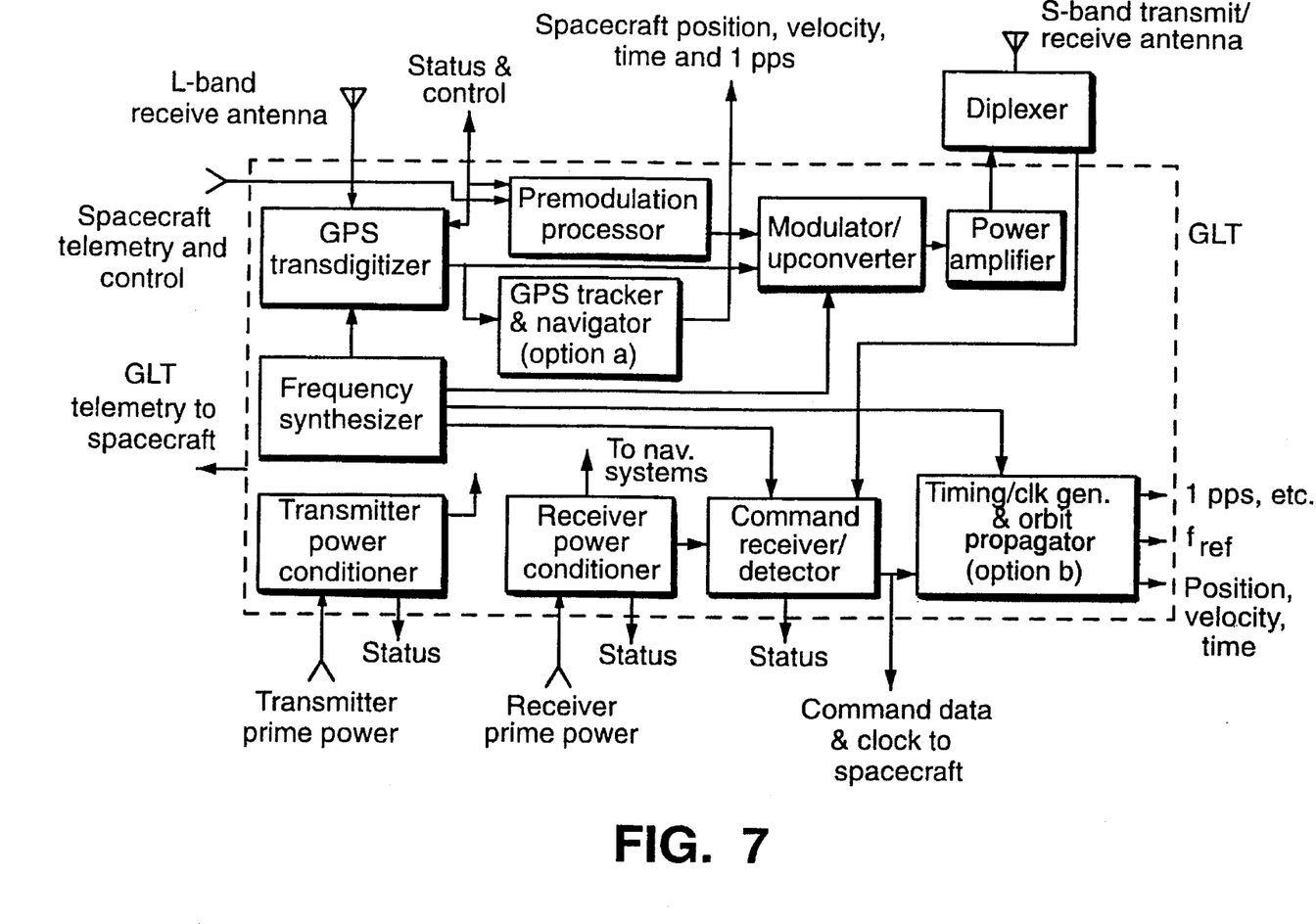
FIG. 7 illustrates a simplified block diagram of the GLT embodiment of the invention.

The GLT, as shown in FIGS. 6 and 7, comprises a NASA Spaceflight Tracking and Data Network (STDN)/Deep Space Network (DSN), USAF/Air Force Satellite Control Network (AFSCN), or GLT command-format (GLT-CF) compatible command receiver/detector, a 20-Mbps-capable pulse code modulation/phase shift keying (PCM/PSK) telemetry transmitter with a selectable-rate forward error correction (FEC) encoder and optional embedded encryptor, and dual-mode spacecraft-positioning subsystem including a GPS receiver and/or GPS transdigitizer. By combining command, telemetry, and positioning functions into one subsystem, overall spacecraft assets are conserved because resources (DC/DC power converters, local oscillator signals, small signal and power amplifier circuits, chassis mounting deck space and weight, cable harnesses, connectors, etc.) are shared. Losses due to inefficiencies in circuits are incurred only once, thereby saving the valuable resources of the small satellite. With the mass and size of "overhead" systems (e.g., communications and navigation) conserved, the primary objectives of the mission can be more easily and efficiently met, or those objectives can be expanded for the overall benefit of the program.

The primary benefits of the GLT system include significantly increased uplink and downlink data rates; simplified mission operations; and, while in the transdigitizer-only configuration, significant mass and size reduction for a major spacecraft subsystem. High-accuracy orbit predictions and measurements are made on the ground, thereby minimizing the hardware functions required onboard the spacecraft. In the transdigitizer-only mode, mass is reduced from ≈7 to <1 lbm, and size from ≈300 to <30 in.$^3$ relative to today's standard transponders.

As space-qualified GPS receiver technology matures, similar mass and size savings will likewise be realized in the full receiver configuration. Downlink data rates can be increased from the typical 1 to 3 Mbps rates to 20 Mbps with a built-in and selectable-rate ½, ¾, or ⅞ convolutional encoder and optional data encryptor. Standard uplink command data rates and structures (NASA STDN or AFSCN Space Ground-Link System (SGLS)) are supported, but if desired, uplink command and data rates can be increased to greater than 1 Mbps using the GLT-CF. Such increases are achievable because with the GLT system, compatibility with signal structures designed for ranging code transmission is no longer required. Instead, modulation schemes are employed that are designed for data transmission and that promote streamlined spacecraft hardware. Mission operations are greatly simplified and costs dramatically reduced because planning, scheduling, and use of in-orbit and ground-based coherent ranging systems are not needed. High-accuracy orbits can be predicted or calculated, capitalizing on GPS positioning techniques.

The complexities and costs of mission operations are reduced as a result of the way the GLT positioning function is implemented. Rather than ground stations and/or TDRSS satellites transmitting a high-power spread-spectrum or tonal ranging signal to be received, detected, and coherently retransmitted by the spacecraft's transponder, the GLT receives the existing and continuously available signals transmitted by satellites in the GPS constellation. Therefore, no ranging operations have to be scheduled for ground stations or for the TDRSS.

The GPS signals, which are code-division multiplexed in a frequency spectrum common to all satellites, are transdigitized (received, filtered, amplified, and digitized) by the GLT, thus creating a single bit stream. Then, depending on the mode of operation implemented, the resultant bit stream is either processed onboard by a GPS tracker/navigator or transmitted to the ground along with the spacecraft telemetry data via a special type of quadraphase-shift-keyed modulation of the downlink carrier.

In the latter case, ground-based systems recover the transdigitized GPS signals and generate the spacecraft position and velocity in near-real time. Single or multiple-pass data sets can be extrapolated to generate satellite ephemeris data. The GLT-derived position data can be used exactly as two-way Doppler-derived position data are now used: in real time by ground users, they can be logged for later correlation with sensor/instrument data, or they can be immediately uplinked to the spacecraft for use onboard.

A principal advantage to the use of GPS for orbit determination comes from the fact that the GPS constellation provides users with multilink observability, providing geometric "strength" to the position determination processing. This fact is exploited when using either full GPS receivers or transdigitizers, even when only one ground station is processing transdigitized data. Thus accurate orbit solutions can be obtained from relatively short-arc observations of the user satellite being tracked. Long data collection intervals from multiple ground-based tracking stations, typically required with two-way Doppler tracking methods, are not necessary.

As is the case for any GPS navigation system, position, velocity, spacecraft time, and orbital ephemeris data can be provided at several levels of accuracy. The GPS Standard Positioning Service (SPS), which is available to all users, provides signals and data that allow the accuracy of the users' navigation solutions to be controlled by operators at the GPS Master Control Station (MCS) to any level between 15 and 500 m, SEP (spherical error probable). This degradation to accuracy is achieved via the selective availability (SA) feature in which the signals and data are intentionally modified so as to degrade the accuracy of the users' navigation solutions to the level selected by the MCS controllers. Authorized users are able to employ the GPS Precise Positioning Service (PPS) in which encrypted information in the GPS message data can be applied to undo the effects of the SA modifications and thereby maintain an accuracy level of approximately 15 m, SEP.

The accuracy of both positioning methods, particularly the SPS, can also be improved through special tracking and data processing procedures. One very effective method is differential processing whereby a ground-based reference receiver, using a surveyed receiving antenna, tracks and processes signals from the same GPS satellites being used to navigate the GLT-equipped satellite. Since many of the error sources (including SA-induced error sources) affecting GPS measurements are highly correlated over fairly large baselines, the data produced by the reference receiver can be used to compute corrections for the data obtained through the GLT, thereby improving the accuracy of the position/orbit estimates for the host vehicle.

Alternately, the ground-based GPS receiver operating on the GLT-transdigitized data stream can be PPS-compatible. Cryptovariable key changing and similar PPS-related procedures are accomplished more easily on the ground than in orbit. Other improvements are possible through the use of long arc or multi-orbit processing and kinematic positioning techniques. These GPS processing techniques are well developed and understood and can be implemented in ground stations using systems based on existing hardware and software developed and operating at APL and other locations.

When configured with an embedded GPS receiver (option 'a' in FIG. 7), the GLT provides fully autonomous positioning and time recovery. This configuration (when used with ground-network receivers for differential GPS operation) provides the most accurate positioning capability. Standard GPS receiver and navigation control software would be implemented.

In this configuration, the transdigitizer output feeds the GPS signal tracking and navigation hardware, thereby eliminating redundancy for the RF section of the receiver and saving mass, size, and power for this function. The transdigitizer then provides backup and graceful degradation functionality without measurable impact on the spacecraft hardware except for transmission of the bits to the ground, which, as discussed below, will be of minimal consequence.

Use of the transdigitizer-only configuration (FIG. 7 without option 'a') has several unique advantages. In this configuration, the spacecraft position is computed on the ground rather than on the spacecraft. The configuration provides the highest system reliability, significant GPS-processing flexibility, and minimum size, mass, cost, and complexity of the flight hardware. Position and velocity of the spacecraft are computed within seconds of ground data reception, and accurate spacecraft orbital ephemeris elements are computed before the end of one pass over a single ground station.

The ephemeris can be uplinked to the spacecraft for use by an onboard orbit propagator, optionally embedded within the GLT (option 'b' in FIG. 7). In this configuration, ground-computed ephemeris data are internally and automatically extracted by the GLT's command detector subsystem from the uplinked command and data stream and are then fed to an internal orbit propagator microcontroller/timing circuit, which generates position, velocity, and time data and a hardware 1-pps signal. This function could be implemented in a low-throughput radiation-tolerant high-reliability microcontroller implemented in a single digital gate array with virtually no increase in GLT mass, size, and power. The ground station could easily be automated to compute the ephemeris data set and uplink it to the spacecraft at the end of each pass that data are collected, thereby emulating fully autonomous onboard navigation.

The GLT comprises eight subsystems: GPS transdigitizer, premodulation processor, modulator/upconverter, power amplifier, frequency synthesizer, command receiver/detector, and transmitter and receiver power conditioners. Two different optional configurations include a ninth subsystem: one incorporates a GPS tracker and navigator (option 'a' in FIG. 7), whereas the other incorporates a timing/clock generator and orbit propagator (option 'b' in FIG. 7).

The first of three primary functions of the GLT is that of a command receiver/detector. The command receiver accepts uplink command signals from the S-band diplexer via the transmit/receive antenna. Any channel in the standard STDN or SGLS command uplink band can be selected for use at time of manufacture.

In a design for an STDN receiver, a dual-heterodyne downconverter outputs the selected channel to a phase demodulator, which recovers the 16-kHz subcarrier containing the PCM/BPSK (biphase shift keying) data. A command detector demodulates the subcarrier, bit synchronizes to the data, and, if the data are differentially encoded, converts them from non-return-to-zero mark (NRZ-M) to NRZ level (NRZ-L) and outputs the command bit stream and clock to the spacecraft.

In an optional GLT-CF channel design, the command channel is, by choice, no longer STDN- or SGLS-compatible. Significant advantages can be achieved because the GLT system design permits removal of the typical coherent receiver requirement that exists for the benefit of the ranging and two-way Doppler functions of the standard transponders. The new GLT-CF channel permits higher uplink command and data rates, in the megabits-per-second range, for more efficient software uploads and other possible advantages. A noncoherent command receiver/detector will result in smaller, lighter, simpler, less expensive, and higher-reliability flight hardware. The feasibility of a fully digital demodulator and command detector design is also under investigation. Such a design would present simplified symbol and data rate switching and other obvious advantages inherent when digital components replace analog circuits.

The second function of the GLT is that of a telemetry data transmitter. This function is performed by receiving the telemetry bit stream from the host satellite's pulse code modulation encoder and processing the data with an optional encryptor and differential encoder. Variable-rate FEC encoding is also provided. The resultant bit stream is then transmitted to the ground station(s) via an S-band RF digital data link through the S-band diplexer/antenna system.

The third function is that of a GPS transdigitizer, which can operate in one of three modes: L1 clear acquisition (C/A) code, L1/L2 narrowband, and L1/L2 wideband. The L1 C/A mode function is implemented by receiving GPS L1 C/A code signals via an L-band microstrip antenna system and downconverting these signals to near-baseband. The baseband signal is hard-limited, optionally sampled, processed like the telemetry data (optionally encrypted and encoded), and also transmitted to the ground station(s) via the same S-band RF data link as the telemetry data. For the L1 C/A mode, the signal is not sampled and is therefore asynchronous with the telemetry data. For the dual-frequency modes, each signal is sampled, and the two products are interleaved to create one bit stream for transmission.

A frequency synthesizer generates the local oscillator signals required by the GPS transdigitizer, the command receiver/detector, and the modulator/upconverter. The frequency synthesizer includes a fundamental crystal oscillator and two phase-locked loop (PLL) synthesizers. This setup enables selection of the GLT output frequency from 2207.5 to 2392.5 MHz. To minimize size, mass, and power dissipation, the frequency plan is devised so that the command receiver, telemetry transmitter, and GPS downconverter share the same local oscillator signals whenever possible.

The receiver and transmitter power conditioners accept primary power from the spacecraft at 28 ($\pm$7) Vdc. Each power conditioner reduces this value to a lower voltage with a DC/DC converter and conditions the voltage via linear regulators for use by the command receiver, GPS transdigitizer, and transmitter electronics. Power-on and power-off sequencing are provided to ensure reliable operation of the GLT's gallium arsenide field-effect transistor devices.

The GLT receives the GPS signals from an L-band receive antenna with hemispherical coverage pointing toward the local zenith. GLT downlink signals are transmitted and uplink command signals are received by an S-band transmit/receive antenna with hemispherical or spherical coverage pointing toward Earth. Typical configurations for both antennas include the bifilar helix and the microstrip patch. Typical achievable antenna gains are >−6 dBic for all elevations >10° and >−2 dBic for all elevations >30° relative to the ground plane of each antenna.

An S-band antenna diplexer is provided as an integral part of the system. The GLT S-band downlink signal is received and passed through a band-reject filter with a notch at the command receive frequency. The circulator routes this output signal to the S-band antenna. The command uplink signal is received from the S-band antenna and is routed to a bandpass filter by the circulator. The bandpass filter is tuned to the command receive channel selected for the mission. A miniature design will use ceramic filter technology.

The GLT's downlink signal structure is unique. For the two RF data links supported, considerably different requirements exist. For typical applications, the telemetry channel is the higher data rate channel with a postdecryption bit-error-rate (BE) requirement of $10^{-6}$, whereas the GPS transdigitizer channel must transmit only $\approx$2 Mbps (in the L1 mode) with an equivalent BER requirement of $10^{-3}$. To optimally satisfy the different sets of requirements for this configuration, a modulation scheme called unbalanced asynchronous quadrature-phase shift keying (UA-QPSK) is used, wherein the telemetry data modulate the in-phase or "I" channel of a QPSK modulator, while the GPS data modulate an attenuated quadrature-phase or "Q" channel. The resultant signal has an I/Q power ratio of 6 dB, and the "penalty" to the telemetry link due to the presence of the GPS data link is only 1 dB. The modulator block diagram and the output spectrum are shown in FIG. 5.

For higher data rate transdigitizers working with both L1 and L2, trellis-coded modulation may be more practical, depending on transmission and width considerations. The optimal design considering bandwidth and power efficiency is very application-specific and complex. L1 C/A code transdigitizers will be the baseline configuration for the discussion below. In this mode, the GPS data are not sampled, and therefore BER has no meaning. However, the concept can still be used to qualitatively describe channel performance.

The UA-QPSK modulation scheme is uniquely well-suited for the GLT application. It enables concurrent transmission of two different data streams on a single downlink and allows the ground-system demodulator to unambiguously separate the I/Q signals. It permits standard ground-station telemetry receivers with BPSK demodulators to recover spacecraft telemetry data while the GLT concurrently transmits GPS-transdigitized data. In addition, the scheme allows sharing of resources like the mechanical package, internal power conditioners, oscillator, frequency synthesizers, amplifiers, etc., thereby providing a combined system that is smaller and lighter than the sum of two separate systems. Finally, it facilitates the optimal sharing of transmitter power between the two links. It can be seen that the GPS transdigitizer function comes very nearly "free" to the host vehicle as measured by size, mass, and prime power relative to what is required for the telemetry transmitter function alone.

The GLT ground system can take on one of five different configurations: single-station stand-alone, single-station differential, multiple-station stand-alone, multiple-station differential, and high-precision postevent processing.

The distinctions between the different ground-station operating modes are illustrated in FIGS. 8 through 11. In FIG. 8, the signal and data flow paths for the most basic ground system are shown. In this single-station stand-alone configuration, moderate positioning and orbital ephemeris accuracies are achievable. The 1-bit quantized baseband data generated by the GPS transdigitizer in the GLT and modulated onto the Q channel of its QPSK modulator are recovered by the U-QPSK demodulator, along with the reconstructed carrier signal. These signals are passed on to the GPS downconverter/timing unit, where the reconstructed carrier is downconverted to baseband. The reconstructed carrier and the Q output of the demodulator are sampled and passed on to the GPS navigation system (as well as being stored on digital magnetic tape if desired).

The navigation system contains a standard GPS tracking and navigation system with sufficient Doppler and Doppler-rate dynamic range to track the satellite-motion-induced Doppler effects. The system locks on to the GPS L1 C/A signals (or L1 and L2 P-code signals) received by the GLT L-band antenna and generates range and Doppler measurements for the GPS satellites being tracked. The range and Doppler measurements are then processed with a Kalman filter to generate the position, velocity, and orbital ephemeris estimates.

At least four satellites are necessary to produce usable tracking results, but five or six are highly recommended to produce results that are consistently of high quality. No additional equipment in the satellite-borne GLT is needed to be able to track additional satellites; tracking is totally determined by the ground processing stations. The GLT processes all GPS signals visible to it.

Figure 9:
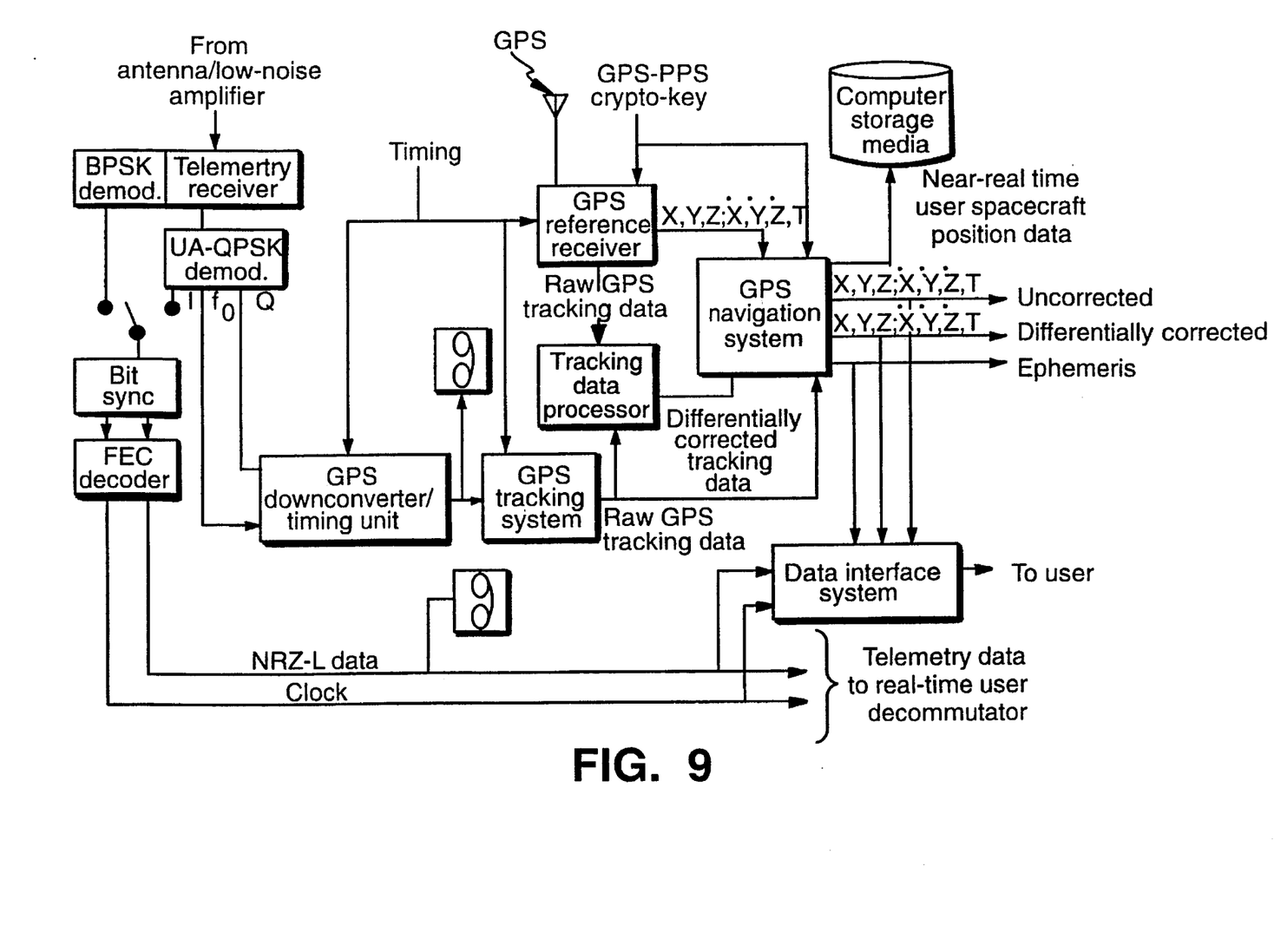
FIG. 9 illustrates the single-station differential GPS configuration of the GLT ground system.

Substantial improvement in accuracy can be achieved by adding a differential GPS ground processing capability as shown in FIG. 9. This is the baseline configuration for the GLT system, since so much is gained in system performance for so little additional ground-station equipment. Here, a GPS reference receiver is added, which receives signals directly from the GPS satellites through a precisely surveyed receiving antenna. The tracking data from this receiver enable the systematic error sources in the GPS measurements, which are highly correlated over the relatively short baseline between the tracking station and the satellite being tracked, to be calibrated and thereby removed from the data being sent to the Kalman filter orbit estimator. The expected accuracy for this single-station differential mode is 2 to 5 m, SEP, for a short-arc solution, even with large SA-induce system offsets.

Figure 10:
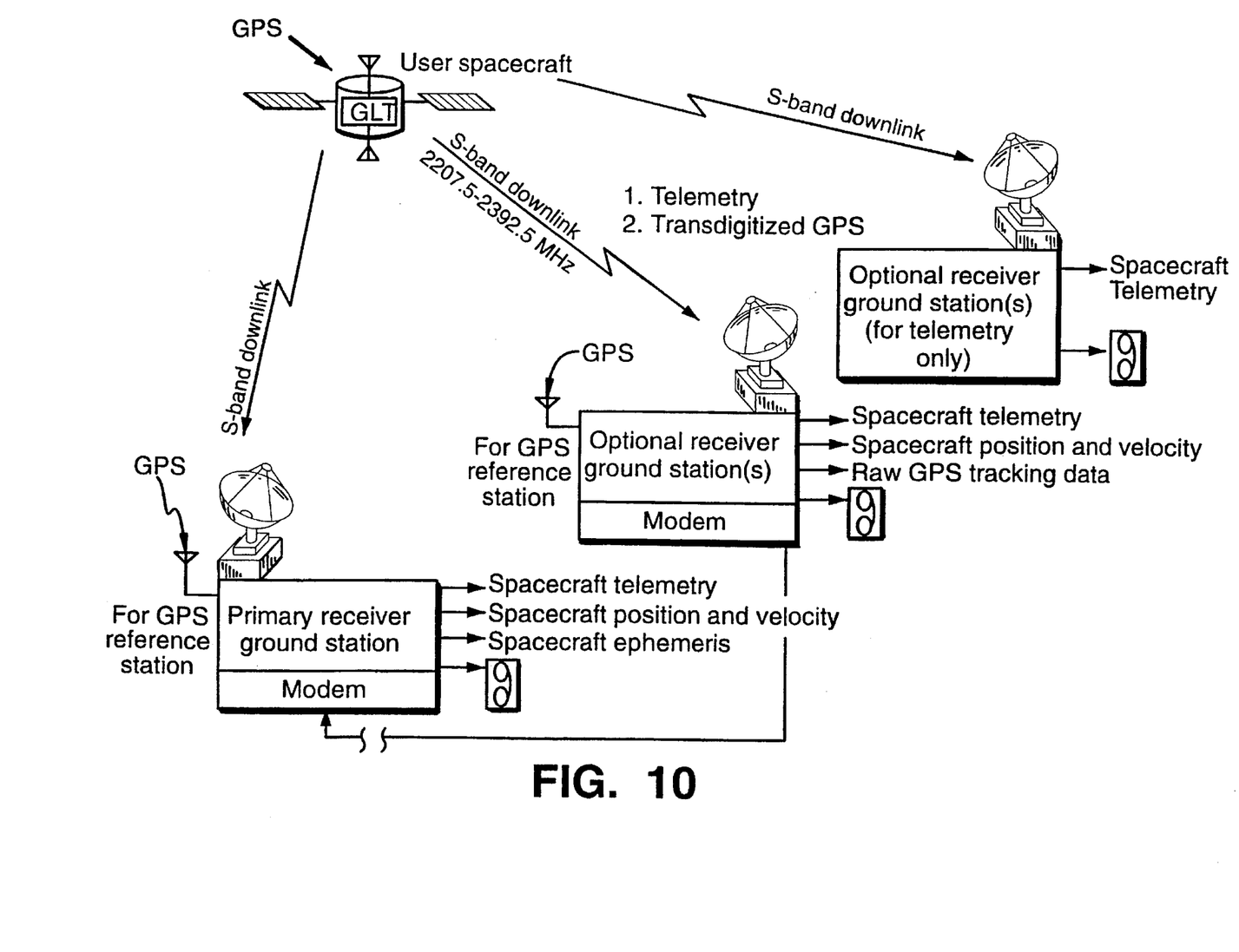
FIG. 10 illustrates the multiple-station differential GPS configuration of the GLT ground system.
Figure 11:
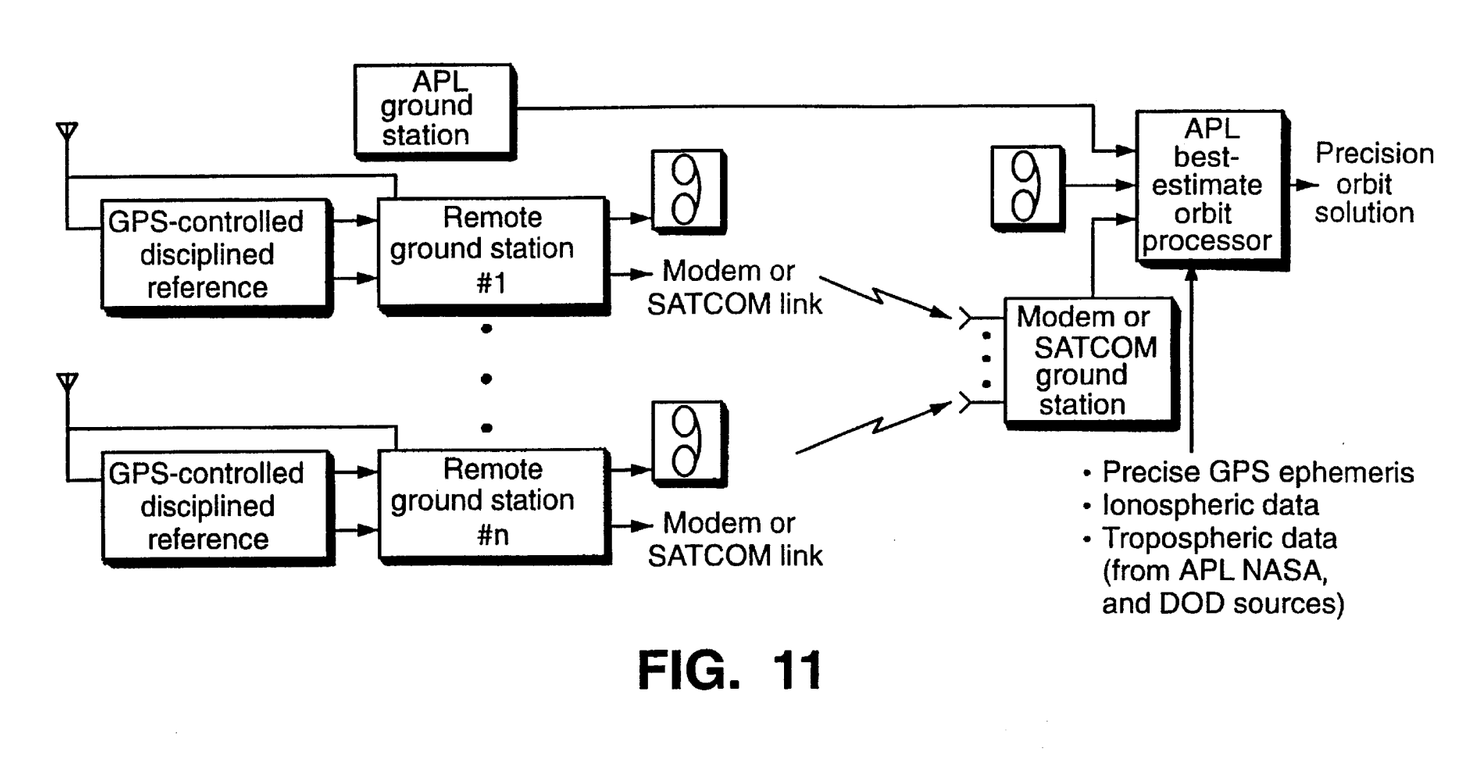
FIG. 11 illustrates the high-precision postevent processing configuration of the GLT ground system.

System accuracy, in either stand-alone or differential configurations, can be improved by processing data from multiple receive stations, thereby achieving observability of a greater portion of the satellite orbit. The multiple-station differential configuration is shown in FIG. 10. The processed data are sent from the "remote" stations to the primary ground station for integrated orbit determination processing via modem or a satellite communications channel. If the selected site is not equipped with a precision frequency reference system, the GLT ground-station system will include a GPS timing receiver with a GPS-controlled disciplined reference oscillator to generate the required timing signals. NASA ground reference stations exist that are used for missions for differential correction of GPS-based navigation data. The GLT system would be compatible with those data sets. The logical location of the GLT ground stations for this high-precision operating mode would be these reference stations. Existing equipment, with small or no modifications, could probably be used in the mode described here.

A final level of improvement can be achieved by reprocessing all data tapes previously recorded at tracking station(s). In this high-precision postevent processing mode, shown in FIG. 11, accuracy improvements are achieved by optimal tracking of the GPS signals, improved modeling of the GPS error sources (particularly the ionospheric errors), and the use of improved GPS ephemeris estimates (posttest smoothed estimates rather than real-time predicted estimates obtained from the GPS message data). The accuracy achievable under this scenario, over the observation arc, is estimated to be in the 1- to 15-ft range, depending on whether a single- or dual-frequency transdigitizer is employed, the altitude of the satellite, and the total electron content of the ionosphere at the time. Potential uses for this method include special experiments that may require high-precision position data over a short arc of an orbit.

The GLT-transmitted signal structure is such that standard ground stations throughout the world (i.e., not only NASA STDN or AFSCN SGLS stations) that employ standard BPSK demodulators and receiver IF frequencies of 20 MHz can recover GLT-transmitted data for data rates at or below 6 Mbps if FEC is disabled, and for data rates at or below 3 Mbps if FEC is enabled. For higher data rates, sites employing other often-used receiver IF frequencies of 70 and 110 MHz can support the higher bandwidths associated with data rates up to 20 MHz. The telemetry receive site could be positioned anywhere adequate antenna resources are available and in view of the spacecraft. This mode of operation of the GLT/Command, Telemetry, and Positioning System provides significant flexibility for telemetry recovery operations.

The GLT will significantly reduce the complexity, size, mass, and cost of the spacecraft hardware and also will simplify the ground-based processing by removing the coherent uplink carrier and ranging requirement. Ground stations will be smaller and more transportable, providing flexibility for mission operations, even to the point where individual principal investigators could afford to command, control, track, position, and collect data from their own spacecraft. For typical moderate-accuracy positioning requirements of low-Earth-orbiting spacecraft, only one ground station is required. Position, velocity, and ephemeris data would be available in near-real time to NASA, DoD, and the investigator. Traditional institutional orbit processing facilities would be freed of routine tasks.

In time, fully embedded GPS receivers will be the navigation instrument of choice for most spacecraft, providing full autonomy for position-dependent sensor orientation maneuvers, attitude control, and data/position correlation. The GLT system design concept and topology promote that goal by providing a logical path (both technical and programmatic) for the embodiment of GPS receivers into the spacecraft communications system. However, many small satellites cannot yet accommodate the cost, size, and weight of space-qualified GPS receivers. For these applications, the GLT, via the transdigitizer, provides an alternate method for the exploitation of the GPS system for spacecraft positioning.

For missions where the transdigitizer-derived position data are adequate (the vast majority of missions), a GLT configured with only a transdigitizer (versus a full GPS receiver) is the optimal configuration. Impacts to the spacecraft are nearly imperceptible as measured by size, mass, and power dissipation, and reliability is inherently increased. For missions where a full GPS receiver is required, the transdigitizer is still incorporated, providing a built-in backup with a graceful degradation of service.

Whether used in conjunction with a full GPS receiver or by itself, the transdigitizer provides an "umbilical cord" between the spacecraft and ground controllers, yielding high-accuracy positioning capability using high-reliability and minimum-complexity hardware on the spacecraft while allowing the sophisticated positioning processing to execute on the ground. Thus, one could expect the use of the transdigitizer to overcome the hesitancy of programs to rely solely on fully autonomous GPS receivers for orbit determination.

The GLT is ideally suited for small satellites or any spacecraft with command, telemetry, and moderate-to-high-accuracy positioning requirements and where reduced spacecraft size and weight are important. Likewise, the GLT, along with its associated ground system, is ideally suited for small satellite programs, with their characteristically small budgets; by using the new system, it is anticipated that millions of dollars can be saved, per mission, in hardware acquisition and mission operations costs.

We claim:

1. A device for using telemetry data from a missile and global positioning system (GPS) signals to generate high accuracy trajectory estimates for the missile, the device comprising:

means for downconverting the GPS signals;

means for simultaneously processing the downconverted GPS signals and the missile telemetry data;

means for modulating a carrier signal using the downconverted and processed GPS signals and the processed missile telemetry data; and means for transmitting the modulated carrier signal, the modulated carrier signal being used to generate the missile trajectory estimates.

2. The device as recited in claim 1, the processing means further comprising means for digitizing the downconverted GPS signals.

3. The device as recited in claim 2, the carrier signal modulating means further comprising:

means for modulating an in-phase of a quadrature phase shift keying (QPSK) modulator using the processed missile telemetry data; and means for modulating an attenuated quadrature-phase of a QPSK modulator using the downconverted, digitized GPS signals.

4. The device as recited in claim 2, the processing means further comprising means for encrypting the missile telemetry data and the downconverted, digitized GPS signals.

5. The device as recited in claim 4, the processing means further comprising means for encoding the missile telemetry data and the downconverted, digitized GPS signals.

6. The device as recited in claim 1, the transmitting means comprising:

means for upconverting the modulated carrier signal;

means for amplifying the upconverted, modulated carrier signal; and means for radiating the amplified, upconverted, modulated carrier signal.

7. A device on board a satellite for using telemetry data from the satellite and global positioning system (GPS) signals to generate position and velocity for the satellite, the device comprising:

means for downconverting the GPS signals;

means for simultaneously processing the downconverted GPS signals and the satellite telemetry data;

means for modulating a carrier signal using the downconverted and processed GPS signals and the processed satellite telemetry data;

means for transmitting the modulated carrier signal to a ground station, the modulated carrier signal being used to generate the position and velocity of the satellite; and a receiver/detector means for receiving signals from the ground station.

8. The device as recited in claim 7, further comprising means for generating the position and velocity of the satellite.

9. The device as recited in claim 3, wherein the QPSK modulator comprises an unbalanced offset-QPSK modulator.

10. The device as recited in claim 9, wherein the means for modulating uses an unbalanced asynchronous quadrature phase shift keying modulation scheme.

* * * * *